(12) United States Patent
Sinko et al.

(10) Patent No.: US 7,125,925 B2
(45) Date of Patent: Oct. 24, 2006

(54) CONDUCTIVE POLYMER-INORGANIC HYBRID COMPOSITES

(75) Inventors: John Sinko, Mequon, WI (US); Sze Cheng Yang, Wakefield, RI (US)

(73) Assignee: The Board of Governors for Higher Education State of Rhode Island and the Providence Plantation, Providence, RI (US)

( * ) Notice: Subject to any disclaimer, the term of this patent is extended or adjusted under 35 U.S.C. 154(b) by 66 days.

(21) Appl. No.: 10/652,792

(22) Filed: Aug. 29, 2003

(65) Prior Publication Data

US 2004/0149963 A1    Aug. 5, 2004

Related U.S. Application Data

(63) Continuation of application No. PCT/US02/07020, filed on Mar. 8, 2002.

(51) Int. Cl.
*C08K 3/04*    (2006.01)

(52) U.S. Cl. .................. 524/430; 524/431; 524/432; 524/433; 524/420; 524/495

(58) Field of Classification Search ............... 524/430, 524/431, 432, 495
See application file for complete search history.

(56) References Cited

U.S. PATENT DOCUMENTS 6,150,032 A    11/2000   Yang et al.
6,351,063 B1    2/2002   Lee et al.

*Primary Examiner*—Edward J. Cain
(74) *Attorney, Agent, or Firm*—Gauthier & Connors LLP

(57) ABSTRACT

An organic-inorganic hybrid composite which comprises an inorganic component and an organic conducting component. The inorganic component inhibits deprotonation of the organic conducting component when the composite is exposed to a medium having a pH which would deprotonate the organic conducting component but for the presence of the inorganic component.

32 Claims, No Drawings ated Mar. 8, 2002 and which designated the U.S.

CONDUCTIVE POLYMER-INORGANIC HYBRID COMPOSITES

This is a continuation International Application PCT/US02/07020 filed on Mar. 8, 2002 and which designated the U.S.

BACKGROUND OF THE INVENTION

1. Field of the Invention

This invention relates to electrically conductive organic-inorganic hybrid composites.

2. Description of the Related Art

Inherently conductive polymers (ICP's) are organic polymers with conjugated π-electronic structures in the polymer backbone. Examples of ICP's include polyaniline, polyacetylene, polypyrrole, polythiophene, poly(phenylene vinylene) and chemical modifications thereto. These polymers are potentially useful as additives in paint formulations that are used as protective organic primers and also have anti-electrostatic, electrostatic dispersion and electromagnetic shielding applications. ICP's can exist ill several reduced or oxidized (to a variable degree) states, all of which appear in de-protonated (base) or protonated (salt) forms. However, the various states and forms of the ICP's reversibly interconvert based upon the redox and/or acid-base characteristics of their environment.

ICP's, being reversibly oxidizable and reducible, interact with metal surfaces to inhibit corrosion. Inherently conductive forms of ICP'S, i.e. the salt forms, appear to be protective against corrosion in oxidative environments. In reductive, and specifically alkaline environments, conductive forms of ICPs, are converted to insulator forms thereby deteriorating the effectiveness of ICP's to inhibit corrosion. Consequently, the inherently conductive state of ICP's can not be preserved in alkaline environments which are typically present in atmospheric conditions thereby significantly limiting the use of ICP's in protective organic primers. Also, the conversion of the conductive forms of ICP's to the insulator forms decreases the electrical conductivity of the ICP's thereby diminishing the effectiveness of the ICP's when used as an anti-electrostatic component. Accordingly, a need exists for a conducting ICP that resists conversion to an insulating form when in the presence of alkaline environments. The present invention addresses this need.

BRIEF SUMMARY OF THE INVENTION

The present invention provides organic-inorganic hybrid composites comprised of organic conductive components and inorganic components. The composites are generally in the form of particles having diameters within the range of between 0.1 microns to 5 mm and preferable between 0.1 microns to 125 microns. The particle size distribution of the organic-inorganic hybrid composite can be conveniently determined by any conventional applicable techniques, such as by sieve analysis (preferable for identifying coarse fractions) or the well known Coulter Counter technique, applicable for measuring the distribution of finer particle fractions. It will be apparent that the particle size distribution of hybrids according to the present invention includes a wide range of size fractions as well as particle shape and morphology.

The organic conductive components and the inorganic components are intermixed and the hybrid composite is formed by the physical and/or chemical bonding between the two components. The microscopic structure of the particles can be comprised of an inorganic core with a conductive polymer shell, or optionally a conductive polymer core with an inorganic shell, or optionally an inorganic host with intercalated conductive polymer molecules, or optionally a conductive polymer host with inorganic dopants.

The conductive organic component is selected from the group consisting essentially of inherently conductive polymers (ICP's). The inorganic component is selected from the group consisting essentially of metal oxides, metal sulfides, solid acids, inorganic phosphates, carbon particles, and metal particles or mixtures of the same. The hybrid composites have applications in organic coatings as well as in conductive plastics.

In one embodiment of the invention, the organic conductive component of the polymer comprises water-dispersible ICP's. Water-dispersible ICP's are polymeric complexes of two strands of polymers: a conjugated polymer (e.g., polyaniline, polypyrrole, polythiophene, etc.), and, as the second strand, a polymer with sulfonic, carboxylic, or phosphoric acid functional groups. Examples of the second strand includes poly(styrene sulfonic acid), poly(acrylic acid), poly(vinylmethylether-co-maleic acid), poly(vinylphosphonic acid), etc.

In another embodiment of the invention, the inorganic components of the hybrid composites are selected from the group consisting essentially of finely divided-inorganic oxides, metal sulfides, solid acids, acidic salts, and various forms of carbon and metals. Examples of suitable inorganic oxides include the following: molybdenum oxide, tungsten oxide, vanadium oxide, manganese oxide, copper oxide, silver oxide, ferric oxide, ferrous oxide, magnesium oxide, boron oxide, aluminum oxide, gallium oxide, indium oxide, silicon dioxide, germanium oxide, tin oxide, lead oxide, phosphorus oxides, zinc oxide, titanium dioxide, trivalent chromium oxide, chromium (VI) oxide, nickel oxide, zirconium dioxide or mixtures of the above. Examples of suitable inorganic sulfides include the sulfide counterpart of the aforementioned oxides. Examples suitable of solid acids include molybdic acid, polymotybdic acid, tungstic acid, polytungstic acid, vanadic acid, and all the acids that can be generated from the above mentioned oxides. Further, the inorganic components can be selected from the group consisting essentially of acidic salts, such as acid phosphates (i.e.: zirconium hydrogen phosphates), allotrop forms of carbon (i.e. graphite, carbon black, C60, nano carbon tubes) and metals (i.e. Al, Zn, Cu, or Ag and Au, inclusive colloidal form of latter).

In yet another embodiment, the hybrid composites comprise micron or sub-micron size particles having a diameter within the range of between about 0.1 to 125 microns, preferably 1 to 50 microns, in which the conductive organic components and inorganic components are intimately integrated and respond synergistically to the local chemical environment.

The inorganic components of the hybrid composites extend the pH-stability of the conductive organic component to a pH of >8 by obstructing deprotonation. For example, when subjected to an aqueous environment, the inorganic components can partially dissolve thereby forming a $H^+$ reservoir for the organic conducting component.

In still another embodiment of the invention, the hybrid composites have physical characteristics similar to conventional pigment grade products intended for paint applications, have the combined properties of double-strand polyaniline and of non-chromate corrosion inhibitor pigments and can be readily used in traditional primer and topcoat formulations. Further, the hybrid composites have applications in the field of anti-corrosion coatings and anti-electrostatic coatings. For example, in composites of ICP and some inorganic oxides (ICP/oxide), or composites of ICP and inorganic solid acids (ICP/sold acid), the inorganic components can obstruct the deprotonation reaction of companion ICP components, thus rendering the ICP's useful as corrosion inhibitors or as anti-electrostatic components.

In yet another aspect of the invention, the ICP components of ICP/carbon components or ICP/metal composite components facilitate inter-particle electron transfer if dispersed in non-conductive hosts (such as plastics or ceramics), rendering the composites electrically conductive at relatively low composite loads. The hybrid composites can be used in anti-electrostatic, electrostatic dispersion and electromagnetic shielding applications.

In still another aspect of the invention, the inorganic component comprises a solid acid core (an acidic oxide or an acidic salt) and the organic conductive component comprises an inherently conductive polymer that is adsorbed to the solid acid core thereby forming the hybrid composite. The hybrid composite, wherein the solid acid cores function as consumable $H^+$ reservoirs, possess enhanced resistency against deprotonation and extend the stability of the conductive form of the inherently conductive polymer in alkaline conditions.

In yet another embodiment, the solid acid cores comprise the Bronsted-Lowry or Lewis type acids and have solid consistency at ambient and reasonable higher temperatures, effective solubility in water, high value of specific gravity, a $pK_a<7$ and preferable, $pK_a<5$, low acid-equivalent weight, conjugate base species that inhibit corrosion and a low solubility in organic mediums. Examples of suitable solid acid cores include acidic salts of poly-protic oxy-acids such as phosphoric acid (ortho, pyro, meta, or cyclic trimetaphosphoric or poly-metaphosphoric acid), poly-phosphoric, phosphorous acid, etc. and mixtures thereof, such as, aluminum triphosphate, $AlH_2P_3O_{10}xH_2O$ where $x=0-2$, $Na_3H_{15}Al(PO_4)_8$, $NaH_{14}A_{13}(PO_4)84H_2O$, Ca— or $SrHPO_4xH_2O$ where $x=0-2$, $Ca(H_2PO_4)_2$, $CaH_2P_2O_7$, $Zr(HOPO_3)2H_2O$, $Ti(HOPO_3)2H_2O$, higher oxides of some transition metals which are anhydrides of oxy-acids, such as $MoO_3$, $WO_3$, $V_2O_5$, etc. or mixtures thereof, acidic oxides such as $Fe_2O_3$, $Sb_2O_3$ or mixtures thereof, such as $Al_2O_3$—$SiO_2$, acid catalysts, zeolites in acidic form, such as H-ZSM-5, solid superacids, such as sulfate ion promoted metal oxides, i.e. $SO_4^{2-}/ZrO_2$ or $SO_4^{2-}/TiO_2$, hetero-poly acids, i.e. $H_3PW_{12}O_{40}$, $H_3PMo_{12}O_{40}$, $H_4SiMo_{12}O_{40}$ or diverse acidic salts thereof and any mixtures of the aforementioned suitable acid cores.

In still another embodiment of the invention, the solid acid core comprises a $H^+$ reservoir for the adsorbed ICP of the hybrid composite. The adsorbed ICP forms a coating on the solid acid core. The volume of the solid acid core can be maximized relative to the volume of the adsorbed ICP coating. The hybrid composite is in the form of a particle. The particle size of the hybrid composite, as well as the diameter of the solid acid core can be designed to meet the specific requirements of the intended application. For instance, high performance primers (coil, aircraft), general industrial (OEM) and other maintenance primers are in the range of 7.5–18 microns (0.3–0.7 mils), 25–38 micron (1.0–1.5 mils) and 50–125 micron (2–5 mils) an commercialized pigment grade products' particle size distribution extend in the diameter range of between about 1–25 microns, preferably about 3–6 microns.

In those embodiments where the hybrid composite is formulated as an acid core/coating structure, the diameter (D) of the hybrid composite is within the range of about 0.1–125 microns, preferably 5–25 microns. As for the ICP "coating" component of the hybrid composites, the thickness (d) of the ICP coating is within the range of between about 0.01–2 microns, preferably 0.05 to 0.5 microns.

In yet another aspect of the invention, the diameter of the inorganic acid core is within the range of between about 1 to 123 microns, preferably 1–23 microns.

In another aspect of the invention, the thickness of the ICP "coating" is about 1 micron and the hybrid composite has a diameter of greater than 9.7 microns.

In another embodiment, the thickness of the ICP coating is about 2 microns and the diameter of the inorganic-organic hybrid composite is greater than 19.4 microns.

In yet a further embodiment, the invention includes an organic-inorganic hybrid composite which comprises an inorganic component and an organic conducting component. The inorganic component inhibits deprotonation of the organic conducting component when the composite is exposed to a medium having a pH which would deprotonate the organic conducting component but for the presence of the inorganic component. The composite is characterized in that the inorganic component comprises a matrix. The organic component is intercalated in the matrix.

In yet another embodiment of the invention, the organic-inorganic hybrid composite comprises a guest-host complex wherein the inorganic component of the complex serves as the host or optionally the guest.

In another aspect of the invention, the organic-inorganic hybrid composite comprises an inclusion complex wherein aggregates of the organic component are included in a matrix of the inorganic component or optionally aggregates of the inorganic component are included in a matrix of the organic component.

In yet another embodiment of the invention, the organic-inorganic hybrid composite comprises a structure having at least two layers wherein at least one layer is comprised of the organic component and at least one layer is comprised of the inorganic component.

DESCRIPTION OF THE PREFERRED EMBODIMENT(S)

In one embodiment, the hybrid composites form spontaneously in systems where finely divided solid cores, i.e.: solid acids, metal oxides or metal particles are dispersed into solutions or emulsions of ICP's, by intensive stirring at ambient or higher temperatures. The process can be carried out in aqueous or diverse organic mediums, where adsorbtion of the ICP spontaneously occurs resulting in formation of ICP coatings of uniform thickness on the surfaces of solid acid cores thereby yielding the hybrid composites.

The spontaneous process is driven by physical or acid-base type interactions between the solid acid cores and the ICP which take place at the solid/liquid interface and more specifically, on the surfaces of the solid acid cores. The adsorption process provides adherent and mechanically resistant ICP coatings of significant thickness. The inorganic organic composites are obtainable in pigment grades, as finely divided solids, processed by filtration, washing and drying (at reasonable temperatures) and grinding of the related dispersions.

The invention will now be described with reference to the following non-limiting examples.

Synthesis of PAN: 2(PAA)

The synthesis of the water dispersible double-strand ICP, or PAN: 2(PAA), the polymeric complex of polyaniline, (PAN) and poly(acrylic acid), (PAA) with a 1/2 molar ratio, is described as it was disclosed in U.S. Pat. Appln. Ser. No. 60/063,766, "Conducting polymers for coatings and anti-electrostatic applications" by S. Yang et al., which application is incorporated by reference in its entirety into this disclosure.

The specific method is presented as follows:

Synthesis of Polyaniline: poly(acrylic acid) complex with r=PAN/PAA=0.5, [Polyaniline: poly(acrylic acid), r=0.5] or PAN:2(PAA).

The symbol: indicates the non-covalent bonding between two polymers and the value of r specifies the ratio PAN/PAA.

Step 1: Adsorption of Aniline onto poly(acrylic acid) to Prepare [poly(acrylic acid):(Aniline)n]:

A complex of [poly(acrylic acid):(Aniline)n] was prepared by adsorbing (or binding) aniline onto the poly(acrylic acid) in a water/methanol solution. The adsorbed aniline molecules are polymerized later into polyaniline in Step 3.

10 ml of methanol was mixed with 7.208 gm of poly (acrylic acid) aqueous solution (containing 25% of PAA (Polyciences, MW=90,000). Water was added to increase the volume to 100 ml and the resulting solution was rigorously stirred with a magnetic stirrer for 15 minutes. It contained 0.025 moles of poly(acrylic acid).

Initially, 1.164 g of freshly distilled aniline was slowly added to the above poly(acrylic acid) solution, under rigorous stirring, subsequently an additional 10 ml of methanol was introduced and stirring was continued for 30 minutes. The total amounts of aniline introduced equaled 0.0125 mole and the solution had a pH value of about 5.

Step 2: Preparation of Emulsified poly(acrylic acid):(AN)n Adduct.

100 ml of 2 m HCl was added to the above poly(acrylic acid):aniline solution, whereupon it turned "milky white" immediately, due to (the scattering of the ambient light by) the formation of a macro-emulsion of the polymeric complex. When the solution was continuously stirred vigorously, the intensity of light scattering decreased and the appearance of the system gradually changed from milky white to nearly transparent with a tint of turbidity.

Step 3: Polymerization of the Emulsified poly(acrylic acid):(AN)n Adduct:

3 drops of 1 M aqueous ferric chloride ($FeCl_3$ in 2 M hydrochloric acid, a catalyst for oxidative polymerization) and subsequently, 1.5 ml of 30% hydrogen peroxide (0.013 mole of $H_2O_2$) were added to the reaction mixture prepared according to Step 2., with constant stirring. The solution immediately turned to a dark green color indicating that the aniline polymerized into polyaniline. The reaction was essentially completed within 30 minutes and the system was stirred for another 30 minutes before starting the purification steps.

The reaction product was stable for several months in the aqueous solution with no significant tendency for precipitation.

The reaction product was purified by dialysis against 0.1 M Acetic acid and then dialyzed repeatedly with distilled water. The final pH of the solution, after dialysis, was between pH=3 and 4 due to the dissociation of the poly (acrylic acid) component of the polymeric complex.

A study (of the composition of the complex) indicated that the product was free of low molecular weight impurities, and that the chemical composition of the polymeric complex was very close to that predicted by the applied reagent ratio of PAN/PAA of 1:2.

After the purification process, the solid content of the aqueous solution was found (by evaporation of an aliquot) to be 24 gram of PAN: 2(PAA) per liter, and it was used in all subsequently presented Examples of the present invention.

EXAMPLE 1

Preparation of PAN: 2(PAA)/$MoO_3$ Organic/Inorganic Hybrid Composite.

5.4 gram of $MoO_3$ powder (commercial, from AAA Molybdenum Products, Inc., CO., with particle size of −325 mesh was added to 20 mL of PAN:2(PAA) solution (concentration of 24 g/l) prepared as previously described therein resulting in a suspension which was subjected to low energy ultrasound for 10 minutes and stirred continuously at 25° C., for 3 days. It was allowed to settle overnight and the solid phase of the suspension was separated by filtration, dried at ~100° C. and subsequently pulverized.

The particle size of the inorganic powder can be varied from 10 to 100 nanometer to 5 milimeter. Thus composites of different particle sizes can be produced.

The amount of PAN:2(PAA) adsorbed on the $MoO_3$ phase was calculated from the residual concentration of the former in the filtrate (a green solution), which was determined by UV-visible spectrophotometry at a 800 nm characteristic absorbtion band.

Example #1. also illustrates that the adsorption process is self-limiting, which in this significant case resulted in a composite containing about 8% by weight of PAN:2(PAA). (see Table # 8.2.).

The green powder of the hybrid composite was pressed into a circular disk (a pellet) of 3 to 4 mm thick and 1 cm diameter. The electrical conductivity was measured by two-point probe method with electrical contacts attached to the opposite surfaces of the disk. The value of the electrical conductivities varies with the compression pressure. The conductivity was in the range of $10^{-3}$ S $cm^{-1}$. The obtained PAN:2(PAA)/$MoO_3$ organic/inorganic hybrid composite was characterized as follow:

TABLE #1

| Appearance: | Greenish powder |
|---|---|
| Conductivity: | $10^{-3}$ S $cm^{-1}$ |
| ICP content, %: | 8.6 |
| Yield, before pulverization: | 5.6 g |

EXAMPLE 2

Preparation of PAN:2(PAA)/$Zr(HPO_4)_2$ hybrid composite was carried out in similar fashion as described in Example 1., with the obvious exception, that an aqueous dispersion of finely ground (−325 mesh) $Zr(HPO_4)_2$ (commercial, available from Magnesium Electron, Inc., N.J.) was used as the core component.

The obtained organic/inorganic hybrid composite was characterized as follow:

TABLE #2

| | |
|---|---|
| Appearance: | Greenish powder |
| Conductivity: | $10^{-4}$ S cm$^{-1}$ |
| ICP content, %: | 9.5 (see Table #8.2.) |
| Yield, before pulverization: | 15 g |

EXAMPLE 3

Preparation of PAN:2(PAA)/$V_2O_5$ hybrid composite was carried out in similar fashion as described in Example 1., with the obvious exception in this case, that an aqueous dispersion of finely ground (−325 mesh) $V_2O_5$ (commercial, available from Cerac Inc.) was used as core component.

The obtained organic/inorganic hybrid composite was characterized as follow:

TABLE #3

| | |
|---|---|
| Appearance: | Greenish powder |
| Conductivity: | $10^{-4}$ S cm$^{-1}$ |
| ICP content, %: | 7.2 (see Table #8.2.) |
| Yield, before pulverization: | 5.2 g |

EXAMPLE 4

Preparation of PAN:2(PAA)/$WO_3$ hybrid composite was carried out in similar fashion as described in Example 1., except that an aqueous dispersion of finely ground (−325 mesh) $WO_3$ (commercial, available from Cerac Inc.) was used as core component.

The obtained organic/inorganic hybrid composite was characterized as follow:

TABLE #4

| | |
|---|---|
| Appearance: | Greenish powder |
| Conductivity: | $10^{-3}$ S cm$^{-1}$ |
| ICP content, %: | 5.4 (see Table #8.2) |
| Yield, before pulverization: | 12 g |

EXAMPLE 5

(PAN:2(PAA)/Al hybrid composite was prepared according to the following procedure:

14.5 gram of aluminum powder (commercial, from Aldrich, 200 mesh) was introduced into 100 ml PAN:2(PAA) 2% aqueous solution with vigorous stirring at ambient temperature and in open air and the same conditions were maintained for 5 hours.

During stirring, that the color of the liquid phase, initially of dark green (the color of PAN:2(PAA) in emeraldine salt form) turned to pale yellow, indicating that both, adsorption of PAN:2(PAA) onto the aluminum powder, as well as reduction of the emeraldine salt and conversion of latter to the pale yellow leuco emeraldine form, occurred.

However, at the end of the 5 hours stirring at open air, the color of the aqueous phase returned to the initially observed, although less intense, light green.

Subsequently, the process was finalized by filtration, washing and drying of the solid phase at 80° C. It was observed, that the initially light green color of the filtered solid phase darkened noticeably on drying.

Determined by UV-visible spectroscopy at 800 nm (characteristic absorbtion band of the conductive emeraldine salt state), the PAN:2(PAA) concentration of the filtrate was found to be significantly lower than the initial and allowed the organic content of the hybrid composite to be estimated at 7%.

The obtained gray-green powder, PAN:2(PAA)/Al hybrid composite, displayed moderate electrical conductivity, consistent with the conductive state of the hybrid particles and it was characterized as follow:

TABLE #5

| | |
|---|---|
| Appearance: | Gray-green powder |
| Conductivity: | Moderate |
| Yield: | 15 gm |

As for the process, spectroscopic and electrochemical studies support the assumption, that adsorbtion occurred and notably, during the drying period, a very thin passive layer was formed at the interface between the aluminum metal (core) and the adsorbed PAN:2(PAA) coating.

Apparently, the above mentioned passive layer impedes the rate of electron transfer between the aluminum core and PAN:2(PAA) coating, that is the reduction of the emeraldine salt form of latter to leuco emeraldine form.

Consequently, the PAN:2(PAA) coating, which appears to develop initially in leuco form, is reoxidized to conductive emeraldine salt form upon exposure to air during drying.

EXAMPLE 6

PAN:2(PAA)/Zn hybrid composite was prepared in similar fashion as described in Example 5., except that, in this case finely ground Zn powder (commercial, available from Aldrich, particle size 10 micron.) was used as core component.

The obtained organic/inorganic hybrid composite was characterized as follow:

TABLE #6

| | |
|---|---|
| Appearance: | Greenish powder |
| Conductivity: | $10^{-4}$ S cm$^{-1}$ |
| Yield: | 15 g |

EXAMPLE 7

PAN:2(PAA)/C hybrid composite was prepared in similar fashion as described in Example 5., except that, in this case Carbon black powder (commercial, available from Aldrich, 2–12 micron diameter.) was used as core component.

The obtained organic/inorganic hybrid composite was characterized as follow:

TABLE #7

| | |
|---|---|
| Appearance: | Greenish powder |
| Conductivity: | $10^{-3}$ S cm$^{-1}$ |
| Yield: | 5 g |

EXAMPLE 8

This Example demonstrates the extended resistency to deprotonation of some of the hybrid composites prepared according to the present invention, in comparison with PAN:2(PAA).

For that purpose, an aqueous solution of PAN:2(PAA), aqueous dispersions of distinct samples of selected hybrid composites as well as related inorganic (solid acid) components were titrated (deprotonated) with known amounts of NaOH solution under intense and, in some cases, extended agitation, to the point of complete deprotonation of hybrid composites and/or neutralization of the core components.

The process was considered complete, in every case, at a pH=9.4 the end point where PAN:2(PAA) is completely deprotonated and converted to emeraldine base.

In contrast with PAN:2(PAA), deprotonation of the hybrid composites, according to the present invention, appears to be a slow process: in general, it required 16–18 hours to reach the end point of pH=9.4, which was stable for minimum 48 hours.

The end point was observed by monitoring the pH or alternatively, the UV-visible spectra of the aqueous phase of the systems: as known, in aqueous solutions the conductive and green-colored emeraldine salt form of PAN:2(PAA) possesses characteristic absorbtion band situated at 800 nm, whereas the blue-colored emeraldine base at 630 nm.

Experimental data and determined values of $w_{Ea}$, $c_{H+}$ are presented in Table # 8.1

It is informative to quantify $w_{core}$, $w_{coat}$ and $V_{core}$, $V_{coat}$, the partial mass and volume of the PAN: 2(PAA) coating and of the inorganic core constituents, respectively, of the hybrid composites according to the present invention.

$w_{core}$, $w_{coat}$, the unknowns, can be conveniently calculated from the above experimental data by observing that, for every product) hybrid composite titrated:

$$w_{core} + w_{coat} = w, \text{ and}$$

$$w_{core}/w_{Ea}(\text{core}) + w_{coat}/w_{Ea}(PAN{:}2(PAA)) = n_{NaOH} \text{ (comp.)},$$

where $w_{Ea}(\text{core})$, $w_{Ea}(PAN{:}2(PAA))$ and $n_{NaOH}(\text{comp.})$ are pertinent to distinct core constituents, (PAN:2PAA)—the coating constituent and to the related hybrid composite, respectively.

Partial mass and volume (calculated) values of hybrid composites prepared pursuant to the present invention, $H^+$ content of the same partial volumes as well as the ratio of partial volumes $H^+$ content of hybrid composites, are presented in Table# 8.2.

TABLE # 8.1

| Product according to Example# | w, mass of product titrated: g | $n_{NaOH}$, NaOH consumed: moles × 10³ | $w_{Ea}$, acid equivalent weight, determined: g | $c_{H+}$, molar $H^+$ concentration, determined: mmoles/cm³ | Time necessary to reach end point: hours |
|---|---|---|---|---|---|
| PAN:2(PAA), (coating), | 0.04776 | 0.437 | 109.2 | 9.2 | instantaneous |
|  | 0.04704 | 0.5021 | 93.7 | 10.7 | " |
| PAN:2(PAA)/ MoO₃, (comp.) Ex. # 1. | 1.099 | 7.327 | — | — | 8 |
| MoO₃, (core) see Ex. #1. | 1.0519 | 6.611 | 159 | 29.5 | 8 |
| PAN:2(PAA)/ Zr(HPO₄)₂, (comp.) Ex. # 2. | 1.006 | 3.785 | — | — | slow |
| Zr(HPO₄)₂, (core) see Ex. #2. | 1.0482 | 3.18 | 329 | 10 | slow |
| PAN:2(PAA)/ V₂O₅, (comp.) Ex. # 3. | 0.261 | 0.864 | — | — | 18 |
| V₂O₅, (core) see Ex. #3. | 0.250 | 0.684 | 365 | 9.3 | 18 |
| PAN:2(PAA)/ WO₃, (comp.) Ex. # 4. | 0.272 | 0.89 | — | — | 16 |
| WO₃, (core) see Ex. #4. | 0.260 | 0.74 | 351 | 204 | 16 |

TABLE #8.2

| Composite according to Example # | $W_{core}$ % | $W_{coat}$ % | $V_{core}$ % | $V_{coat}$ % | H+ content of* $V_{core}$ mmoles | H+ content $V_{coat}$ ratio | $V_{core}/V_{coat}$ |
|---|---|---|---|---|---|---|---|
| PAN:2(PAA)/ MoO₃, (comp.) Ex. # 1. | 91.4 | 8.6 | 693 | 30.7 | 2044.3 | 328.5 | 6.2 |
| PAN:2(PAA)/ Zr(HPO₄)₂, (comp.) Ex. # 2. | 90.5 | 9.5 | 74.3 | 25.7 | 743.3 | 275.0 | 2.7 |
| PAN:2(PAA)/ V₂O₅, (comp.) Ex. # 3. | 92.8 | 7.2 | 79.1 | 20.9 | 735.6 | 223.6 | 3.3 |
| PAN:2(PAA)/ WO₃, (comp.) Ex. # 4. | 94.6 | 5.4 | 89.6 | 10.4 | 1828 | 111.3 | 16.4 |

*H+ content was calculated by considering $c_{H+}$ (see Table 8.1.) and related $V_{core}$, $V_{coat}$ values for distinct core or coating constituents.
$c_{H+}$ = 10.7 mmol/cm³ was used for the coating constituent. (see Table 8.1.)

Considering the ratio values of $V_{core}$, $V_{coat}$ partial volumes' H+ content, it can be concluded that solid acid core constituents contribute significantly to the H+ content of hybrid composites.

Consequently, it can be stated that hybrid composites according to the present invention possess extended resistency to deprotonation.

In addition to the coating/core structure of the organic-inorganic hybrid composites, it is also possible that other structures may result from the preparation of the organic-inorganic hybrid composites. During the process for preparing the composite PAN:PAA/V₂O₅, it is possible that the inorganic components may be structurally re-organized before the composite is formed. After a solution of PAN:PAA double-strand polymer (concentration 38 g/L) was mixed with a water suspension of vanadium pentoxide (concentration 105 g/L) in a 5:3 volume ratio, the viscosity of the mixture was measured with a viscometer for a period of 10 hours. The time profile of the viscosity shows a distinct increase of viscosity for the first hour to 70 minutes. Immediately after the mixing the initial viscosity is similar to that of a solution of PAN:PAA with out the inorganic V₂O₅. After stirring for an hour, the viscosity value increased to about twice that of the initial solution. After reaching a maximum value, the viscosity decreased slowly and reaches a value about 20% higher than the pure solution of the double strand PAN:PAA complex. To verify that the time profile was due to the interaction of the organic and the inorganic components, unmixed solutions were prepared of each component at the same concentration and followed the time profile of the viscosity. The viscosities of the unmixed solutions did not change with time. The unmixed solutions were also significantly less viscous than the dispersion of the organic-inorganic composite. The physical properties observed during the mixing process can be consistent with a strong interaction between the organic polymer and V₂O₅. Vanadium pentoxide (like zinc hydrogen phosphate, tungsten oxide, and some mineral clays) is known to have the molecular crystal structure of layered sheets. The chemical bonding is strong within the plane of the two-dimensional sheet. The bonding between the sheets is much weaker, thus allowing for the possibility that the organic molecules intercalate between the sheets and eventually pry open the space between the sheets. The observed increase of viscosity was consistent with the defoliation of the layered structure. The subsequent decrease of viscosity was consistent with the reassembly of particles into organic/inorganic composite.

It is believed that the resulting structure of the composite may be characterized as an organic/inorganic complex, a guest-host complex, an inclusion structure wherein aggregates of the inorganic component are included in a matrix of the organic component or optionally aggregates of the organic component are included in a matrix of the inorganic component, an organic/inorganic complex wherein the organic component is intercalated within a matrix of the inorganic component or a layered structure containing layers of the organic and inorganic components.

Scanning electron microscopy (SEM) and transmission electron microscopy (TEM) studies of the composites indicate that the particle size had been changed. Many particles of the composites were smaller than the original inorganic V₂O₅ particles. This example shows that it is possible that the process may involve significant re-organization of the organic and the inorganic components to form the composite. It is possible that the molecularly mixed organic-inorganic complexes may be formed in these processes.

Synthesis of Solvent-Borne polyaniline:poly(methylacrylate-co-acrylic acid) Complex or PAN:P(MA-AA).

One example of the solvent-borne double-strand conducting polymer is polyaniline:poly(methylacrylate-co-acrylic acid), which is the molecular complex of polyaniline and poly(methylacrylate-co-acrylic acid), or PAN:P(MA-AA). The method for synthesizing PAN:P(MA-AA) is described in U.S. Pat. No. 6,150,032, the disclosure of which is hereby incorporated by reference in its entirety into this disclosure.

Step 1: Synthesis of polyaniline:poly(acrylic acid) Complex with r=PAN/PAA=0.5, or PAN:2(PAA)

The synthesis of PAN:2(PAA) has been previously described herein.

Step 2: Conversion of PAN:2(PAA) to PAN:P(MA-AA)

The polyaniline:poly(acrylic acid) complex prepared in step 1 is dissolved in methanol. To this solution was added a catalytic amount of benzene sulfonic acid or toluene sulfonic acid to serve as a catalysis for esterification reaction. The solution was refluxed for 3 days. The esterification reation converts some of the carboxylic acid group into methyl acetate group. This lowered the solubility of the complex in methanol and the polymeric complex is precipitated out of the solution. The precipitate was filtered out and was dissolved in ethyl acetate. To obtain a higher degree of esterification, the precipitate was redissolved in 1:1 mixture of ethylacetate and methanol, and the solution was further refluxed until precipate again formed. This precipitate was soluble in pure ethyl acetate but was not soluble in 1:1 mixture of ethyl acetate and methanol. The solution was dialyzed against pure ethyl acetate to remove the catalyst. When a 50 ml solution of the reaction product was dried by evaporation of ethylacetate about 1.4 gram of green powder was yielded. The infrared spectrum of the reaction product shows partial conversion of the carboxylic acid functional group to the methyl ester functional group. The solution was titrated with 0.1 M methanol solution of sodium hydroxide, the titratable carboxylic acid functional group was found to be about 45% of the un-esterified PAN:PAA. The reaction product is 3% solution of polyaniline:poly(methylacryulate-co-acrylic acid) dissolved in ethylacetate.

EXAMPLE 9

The example demonstrates that ICPs dissolved in organic solvents spontaneously adsorb onto surfaces of solid particles dispersed in such solutions, resulting in hybrid composites. Preparation of PAN:P(MA-AA)/MoO$_3$ hybrid composite.

A PAN:P(MA-AA)/MoO$_3$ hybrid composite was prepared in three successive steps to illustrate the spontaneous nature of the adsorption of the double-strand conducting polymer on the inorganic particle. A dark green colored solution of PAN:P(MA-AA) 1% by weight in 50 ml of ethylacetate was mixed with 10.0 gram of finely ground MoO$_3$. After 3 minutes of intense agitation the originally light-colored MoO$_3$ powder turned green. When the suspended green powder was sedimented to the bottom of the glass beaker, the upper portion of the originally green solution became transparently clear. This indicated that the polymer PAN:P(MA-AA) in the organic solvent spontaneously adsorbed onto the MoO$_3$ particles, and the conducting polymer in the organic solvent was completely depleted. The resulting suspension was processed by filtration, drying at ambient temperatures and grinding. The dry weight of the product was found to be the sum of the original MoO$_3$ powder plus the mass of the conducting polymer in the 50 ml solution.

Some quality parameters of the hybrid composite are presented below.

TABLE #9

| | |
|---|---|
| Appearance: | Greenish powder |
| Conductivity: | $10^{-4}$ S cm$^{-1}$ |
| Yield: | 10.5 g |

EXAMPLE 10

Similar phenomenon of solution decoloration was observed for the formation of PAN:P(MA-AA)/ZrHPO$_4$. Since the remaining ethylacetate solution is free of the conducting polymer, the solvent could be reused, an advantage for low-cost recycling of the solvents.

EXAMPLE 11

In another experiment, twice the amount of the conducting polymer solution was used for the same amount of MoO$_3$. 10.02 gram of MoO$_3$ was mixed with 100 ml of ethylacetate solution containing 1% of PAN:P(MA-AA).

After 5 minutes of vigorous agitation, the green powder sedimented to the bottom of the beaker. The green color of the powder appeared to be darker than the sample prepared with 50 ml of the conducting polymer solution. The supernatant was not clear but had a light green color. Comparing the UV-Visible spectra of the solutions before and after mixing with the MoO$_3$ powder indicated that the concentration of the conducting polymer was reduced to 23% of its original value. This implies that 77% of the conducting polymer in the solution was deposited onto the inorganic powder. This is consistent with the measured dry weight of 10.74 gram for the hybrid composite.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described our invention, what we now claim is:

1. An organic-inorganic hybrid composite which comprises:
    an inorganic component; and an organic conducting component; the inorganic component inhibiting deprotonation of the organic conducting component when the composite is exposed to a medium having a pH which would deprotonate the organic conducting component but for the presence of the inorganic components wherein the medium is an aciueous medium having a pH greater than 6 and further wherein the organic conducting polymer is a water-dispersible inherently conductive polymer which comprises:
    a first strand comprised of a π-conjugated polymer; and
    a second strand comprised of a polymer selected from the group consisting of poly(styrene sulfonic acid), poly (acrylic acid), poly(vinylmethylether-co-maleic acid) and poly(vinylphosphonic acid).

2. The composite of claim 1 wherein the organic conducting component is an inherently conductive polymer.

3. The composite of claim 2 wherein the inherently conductive polymer is selected from the group consisting of polyaniline, polyacetylene, polypyrrole, polythiophene and poly (phenylene vinylene).

4. The composite of claim 1 wherein the first strand is selected from the group consisting of polyaniline, polyacetylene, polypyrrole, polythiophene and poly (phenylene vinylene).

5. The composite of claim 1 wherein the inorganic component is selected from the group consisting of metal oxides, metal sulfides, solid acids, acidic salts, inorganic phosphates, zeolites and carbon.

6. The composite of claim 5 wherein the inorganic component comprises a core, the organic conducting component is adsorbed thereto to form a coating on the core.

7. The composite of claim 5 wherein the organic conducting component is a double stranded complex comprised of polyaniline and poly(acrylic acid), the complex having a 1:2 molar ratio of polyaniline to poly(acrylic acid).

8. The composite of claim 7 wherein the inorganic component is selected from the group consisting of Zn, C, Al, MoO$_3$, Zr(HPO$_3$)$_2$, V$_2$O$_5$ and WO$_4$.

9. The composite of claim 5 wherein the organic conducting component is a double stranded complex comprised of polyaniline and poly(methylacrylate-co-acrylic acid).

10. The composite of claim 9 wherein the inorganic component is selected from the group consisting of MoO$_3$ and Zr(HPO$_4$)$_2$.

11. The composite of claim 6 wherein the organic conducting component is an inherently conducting polymer and the core has a diameter within the range of between about 0.1 micron to 5 millimeter.

12. The composite of claim 11 wherein the composite has a diameter within the range of between about 0.2 to 125 microns.

13. The composite of claim 11 wherein the coating has a thickness within the range of between about 0.01 to 2 microns.

14. The composite of claim 13 wherein the coating has a thickness of 1 micron and the diameter of the composite is greater than 9.7 microns.

15. The composite of claim 13 wherein the coating has a thickness of 2 microns and the diameter of the composite is greater than 19.4 microns.

16. The composite of claim 2 wherein wherein the inorganic component is selected from the group consisting of metal oxides, metal sulfides, solid acids, acidic salts, inorganic phosphates, zeolites, carbon, such as graphite, fullerenes and nano-tubes, metals and combinations thereof and the composite is dispersed in a non-conductive host.

17. The composite of claim 16 wherein the host is a polymer matrix, a paint system or an organic coating.

18. An organic-inorganic hybrid composite which comprises:
an inorganic component; and
an organic conducting component; the inorganic component inhibiting deprotonation of the organic conducting component when the composite is exposed to a medium having a pH which would deprotonate the organic conducting component but for the presence of the inorganic component, wherein the medium is an aqueous medium having a pH greater than 6 and further wherein the organic conducting polymer is a water-dispersible inherently conductive polymer which comprises:
a first strand comprised of a π-conjugated polymer; and
a second strand comprised of a polymer selected from the group consisting of poly(styrene sulfonic acid), poly(acrylic acid), poly(vinylmethylether-co-maleic acid) and poly(vinylphosphonic acid) wherein the inorganic component comprises a matrix, the organic component being intercalated in the matrix.

19. A method for inhibiting the deprotonation of an inherently conductive organic polymer which comprises:
adding an inorganic solid to a solution comprised of the inherently conductive organic polymer to form a mixture;
stirring the mixture to facilitate the spontaneous adsorption of the inherently conductive organic polymer to the inorganic solid to form an inorganic-hybrid composite;
separating the composite from the mixture, the composite having a core comprised of the inorganic solid enveloped by the adsorbed inherently conductive organic polymer, the inorganic-hybrid composite inhibiting the deprotonation of the inherently conducive organic polymer when the inherently conductive organic polymer is subjected to a medium having a pH which would deprotonate the organic polymer but for the presence of the inorganic solid.

20. The method of claim 19 wherein the inherently conductive organic polymer is water-dispersible and which comprises a first strand comprised of a π-conjugated polymer and a second strand comprised of a polymer selected from the group consisting of poly(styrene sulfonic acid), poly(acrylic acid), poly(vinylmethylether-co-maleic acid) and poly(vinylphosphonic acid) and wherein stirring comprises uninterrupted stirring for three days at 25° C.

21. The method of claim 20 wherein the inorganic solid is selected from the group consisting of metal oxides, metal sulfides, solid acids, acidic salts, inorganic phosphates, zeolites and carbon.

22. A method of synthesizing a composite which can inhibit the deprotonation of an inherently conductive organic polymer which comprises:
adding the inorganic component to the organic conducting component to form a mixture;
stirring the mixture to facilitate the spontaneous adsorption of the organic conducting component to the inorganic component;
separating the mixture to yield the composite.

23. The method of claim 22 wherein the organic conducting component is a inherently conductive organic polymer and the inorganic component is a finely divided solid selected from the group consisting of metal oxides, metal sulfides, solid acids, acidic salts, inorganic phosphates, zeolites and carbon.

24. The method of claim 23 wherein stirring comprises uninterrupted stirring for three days at 25° C.

25. A method for inhibiting the deprotonation of an inherently conductive organic polymer which comprises:
adding an inorganic solid to a solution comprised of the inherently conductive organic polymer to form a mixture;
stirring the mixture to from an inorganic-hybrid composite;
separating the composite from the mixture, the composite inhibiting the deprotonation of the inherently conducive organic polymer when the inherently conductive organic polymer is subjected to a medium having a pH which would deprotonate the organic polymer but for the presence of the inorganic solid.

26. The method of claim 25 wherein the inherently conductive organic polymer is water-dispersible and which comprises a first strand comprised of a π-conjugated polymer and a second strand comprised of a polymer selected from the group consisting of poly(styrene sulfonic acid), poly(acrylic acid), poly(vinylmethylether-co-maleic acid) and poly(vinylphosphonic acid). and wherein stirring comprises uninterrupted stirring for three days at 25° C.

27. The method of claim 26 wherein the inorganic solid is selected from the group consisting of metal oxides, metal sulfides, solid acids, acidic salts, inorganic phosphates, zeolites and carbon.

28. The method of claim 27 wherein stirring comprises uninterrupted stirring for three days at 25° C.

29. The composite of claim 5 wherein said carbon is graphite, fullerenes and nano-tubes, metals or combinations thereof.

30. The composite of claim 21 wherein said carbon is graphite, fullernes and nano-tubes, metals or combinations thereof.

31. The composite of claim 23 wherein said carbon is graphite, fullernes and nano-tubes, metals or combinations thereof.

32. The composite of claim 27 wherein said carbon is graphite, fullernes and nano-tubes, metals or combinations thereof.

* * * * *